United States Patent [19]

Wang et al.

[11] Patent Number: 5,608,637

[45] Date of Patent: Mar. 4, 1997

[54] METHOD FOR DESIGNING A PROFILE EXTRUSION DIE PLATE

[75] Inventors: Hsin-Pang Wang, Rexford, N.Y.; Srinivasu Kakulavar, Gotemba, both of Japan

[73] Assignee: General Electric Company, Schenectady, N.Y.

[21] Appl. No.: 489,908

[22] Filed: Jun. 13, 1995

[51] Int. Cl.$^6$ ............................ G06F 19/00; G06G 7/64; G06G 7/66

[52] U.S. Cl. .............................. 364/468.03; 364/475.01; 425/461

[58] Field of Search ...................................... 364/473, 476, 364/468, 468.03, 475.01; 264/40.1, 40.7, 541; 425/140, 149, 461; 395/118–166; 76/4, 107.1, 107.4, 107.6

[56] References Cited

U.S. PATENT DOCUMENTS 4,751,651  6/1988  Bryan ........................................ 364/473

OTHER PUBLICATIONS

"Plastics Extrusion Operating Manual, An Introduction and Guide to Extrusion" by Allan L. Griff, Tenth Revised Edition, 1992, pp. 1–58.

Cycolac ABS Resin Design Guide, Date Unknown.

"Die Design Principles for Extrusion of Polymers", by Leonard Sansone, Society of Plastics Engineers Educational Seminars, Date Unknown.

Primary Examiner—Paul P. Gordon
Assistant Examiner—Robert J. Dolan
Attorney, Agent, or Firm—David C. Goldman; Marvin Snyder

[57] ABSTRACT

The present invention discloses a method for designing a profile extrusion die plate. In the present invention, a representation of a product made from a resin material and shaped by a die is provided. The representation illustrates a relationship between die swell of the resin, shear rate of the resin through the die, and the ratio of die land length of the die to die opening thickness of the die. From the representation, instances where the ratio of die land length to die opening thickness minimizes die swell of the resin is determined. Experimental data of the resin shaped by an experimental die is then obtained. The experimental data includes draw speed, shear rate, and die swell. The representation and the experimental data are then arranged into die design charts for die opening thickness and die opening width. The die design charts are then used to determine profile dimensions of a desired profile extrusion die.

17 Claims, 9 Drawing Sheets

METHOD FOR DESIGNING A PROFILE EXTRUSION DIE PLATE

BACKGROUND OF THE INVENTION

The present invention relates generally to a profile extrusion die and more particularly to a method for designing a profile extrusion die plate for extruding a polymer resin.

Typically, a profile extrusion die plate is designed by using experimental iterations of experienced-based rules developed by the designer with many cutting trials. In particular, the designer uses rules that have been developed through their experience to derive a die plate design. The derived die plate design is then implemented in an extrusion process and evaluated to determine if cuts of the die land length, die opening thickness, and the die opening width meet the desired profile dimensions. If the dimensions are not met then the die plate must be re-cut so that the desired dimensions can be met. Usually there are many iterations of cutting and then changing the die plate before a die design is derived that yields the desired profile dimensions. This design methodology takes a lot of work and time, and thus the total cycle time from a tooling design to market place will be long and have a high amount of costs associated therewith. In addition, every time the dimensions are changed or a new plastic resin is used in the extrusion process, then the die plate must be redesigned, which involves more time, work, and money. As a result, designers are very reluctant to work with new plastic resins, which hinders the introduction of these resins into the profile extrusion market. Therefore, there is a need for a method that enables a designer to readily design a die plate for shaping products having varying dimensions and for shaping products made from varying types of resins.

SUMMARY OF THE INVENTION

Therefore, it is a primary objective of the present invention to provide a method that enables a designer to readily design a die plate for shaping products having varying dimensions and for shaping products made from varying types of resins.

Another object of the present invention is to provide a methodology for designing a profile extrusion die that reduces work, costs, and total cycle time from tooling design to the market place.

Thus, in accordance with the present invention, there is provided a method for designing a profile extrusion die. The method comprises modeling a representation of a product made from a polymer resin and shaped by a die. The modeled representation illustrates a relationship between die swell of the resin, shear rate of the resin through the die, and the ratio of die land length of the die to the die opening thickness of the die. The representation is analyzed to determine where the ratio of die land length to die opening thickness minimizes the die swell on the resin product. Experimental data of the resin product shaped by an experimental die is then obtained. The experimental data includes draw speed, shear rate, and die swell. The modeled representation and the experimental data are then arranged into die design charts used for selecting die opening thickness, die opening width, and die land length. The design chart for selecting die opening thickness contains representations of draw speed, a thickness factor, and shear rate. The design chart for selecting die opening width contains representations of draw speed, a width factor, and shear rate. The die design charts are then used to determine dimensions for a desired profile extrusion die.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
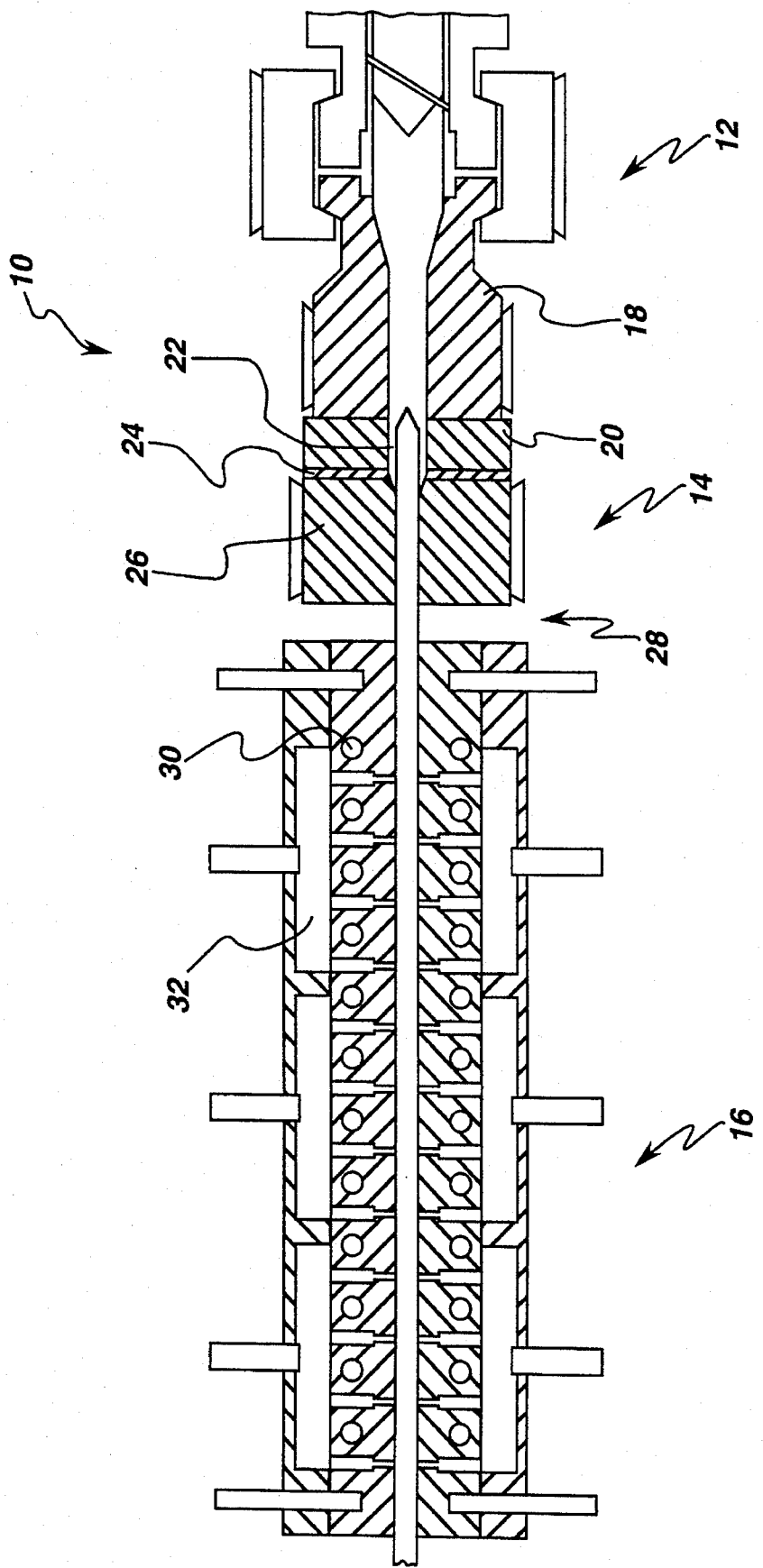
FIG. 1 is a schematic diagram of a profile extruder.

FIG. 1 shows a schematic diagram of a profile extruder 10 used for processing a polymer resin. The profile extrusion process includes three major components, namely the extruder 12, the die 14, and the calibrator 16. The extruder 12 receives the resin, mixes it and melts the resin into a miscible blend, and pumps flame retardant into the blend. The die 14 includes a die body 18 which provides the basic profile shape of the product as the resin blend flows through it. A spider plate 20 connected to the die body holds a mandrel 22 located in the die 14. A pre-land 24 provides additional shaping to the resin blend and a land 26 (i.e., face plate or die plate) provides the final shaping to the blend. The design of the land 26 is described below in further detail. The shaped resin leaves the land and passes through a gap 28 which lets the resin expand and develop some surface area. After passing through the gap 28, the shaped product enters the calibrator 16 which cools the shaped resin and fine tunes the final dimensions of the product. In particular, the resin is cooled by cooling water emitted by water lines 30 while the dimensions are fine tuned by vacuums 32. A puller, not shown, then draws the product from the calibrator. A more detailed description of a profile extrusion process is disclosed in A. Griff, PLASTICS EXTRUSION OPERATING MANUAL, AN INTRODUCTION AND GUIDE TO EXTRUSION, 1–58 (1992), which is incorporated herein by reference.

The design of the profile extrusion die plate depends on the die swell and flow balance of the material used in the extrusion process. In the illustrative embodiment, the material is a polymer resin that exhibits viscoelastic properties such as linear and branched polymers of polycarbonates, polyesters, polyphenylene ethers, polyimides, olefins, polyetherimides, polyamides, polyarylene sulfides, polysulfones, polyetherketones, acrylonitrile butadiene styrene copolymers, polystyrenes and blends, and compositions or copolymers prepared therefrom. In addition, materials made from glass or wood filled polymers are within the scope of the present invention. These materials exhibiting viscoelastic properties experience die swell which is the expansion of the material after it has been shaped by the die plate. The die swell is due to two effects, the Deborah or memory effect and the Weissenburg or flow rate effect. The memory effect occurs when the viscoelastic material flows from the large cross section of the die body 18, through the spider 22, and through the very thin cross section of the pre-land 24 and land 26. As the polymer molecules line up in the entrance region of the die land 26, the molecules try to return to their random state as they move from the die 14. The memory effect is usually overcome by keeping the resin in the length of the die land 26 for a longer residence time so that the material eventually loses its memory of its more random state. The flow rate effect occurs when the viscoelastic material flows very quickly through the die 14, causing the material to shear. Typically, the shear will be greater for viscoelastic material having a thinner thickness and a higher extrusion rate and lower for materials having a thicker thickness and a lower extrusion rate. In the present invention, die swell effects are quantified by mainly focusing on the lengths of the land 26 and die lip openings of the land with computer modeling techniques as well as die swell experiments, while the flow balance is achieved by using a semi-empirical approach that relies on the experience of a die designer.

The use of computer modeling enables a person of ordinary skill in the art to develop a fundamental understanding of die swell for a viscoelastic material in a profile extrusion process. In the present invention, an off-the-shelf viscoelastic computer software package is used to develop a parametric relationship for the effects that flow rate and the ratio of die land length to die opening thickness has on the die swell behavior of the resin. In the present invention, the viscoelastic model is based on the differential Phan-Tien Tanner model, which is well known to skilled artisans. In particular, the model uses material properties such as viscosity, relaxation time, storage modulus, loss modulus, first and second normal stress differences, and extensional viscosity as parameters to find a range of shear rates for corresponding die swell and ratios of die land length to die opening thickness for actual extrusion process conditions.

Figure 2:
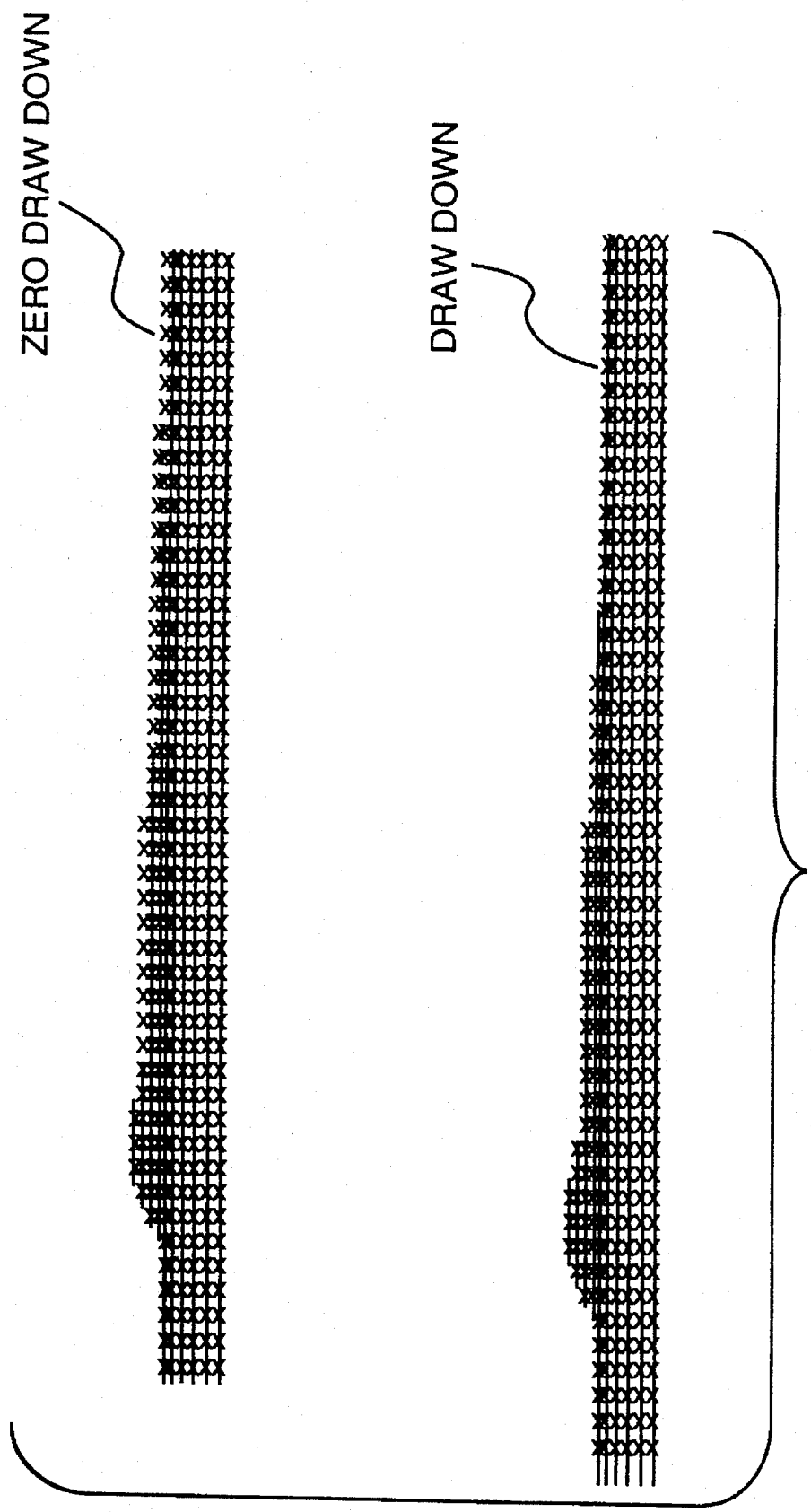
FIG. 2 is a computer generated two-dimensional output showing die swell with and without draw down.
Figure 3:
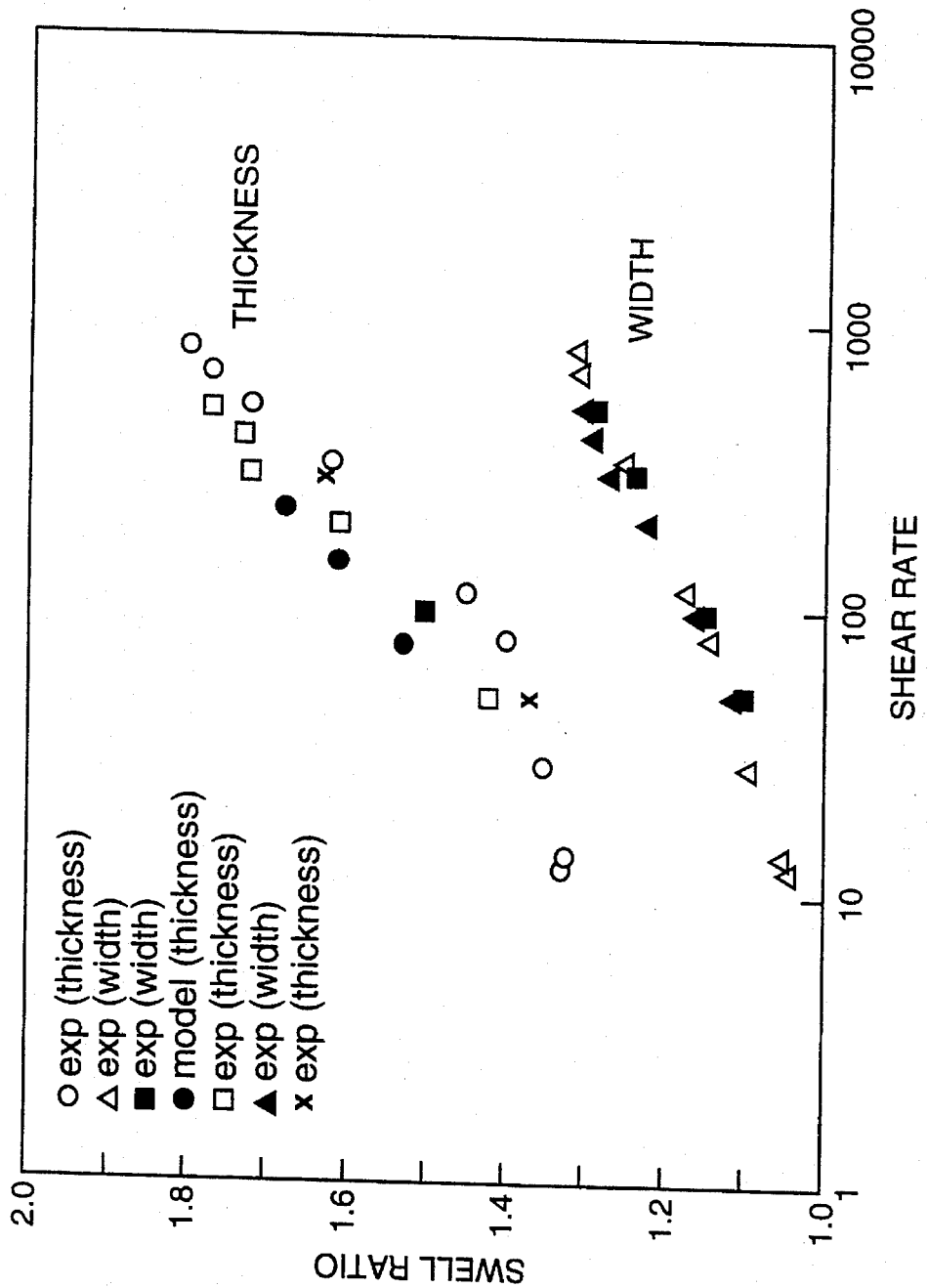
FIG. 3 shows the measured and calculated die swells for a polymer under zero draw down conditions.
Figure 4:
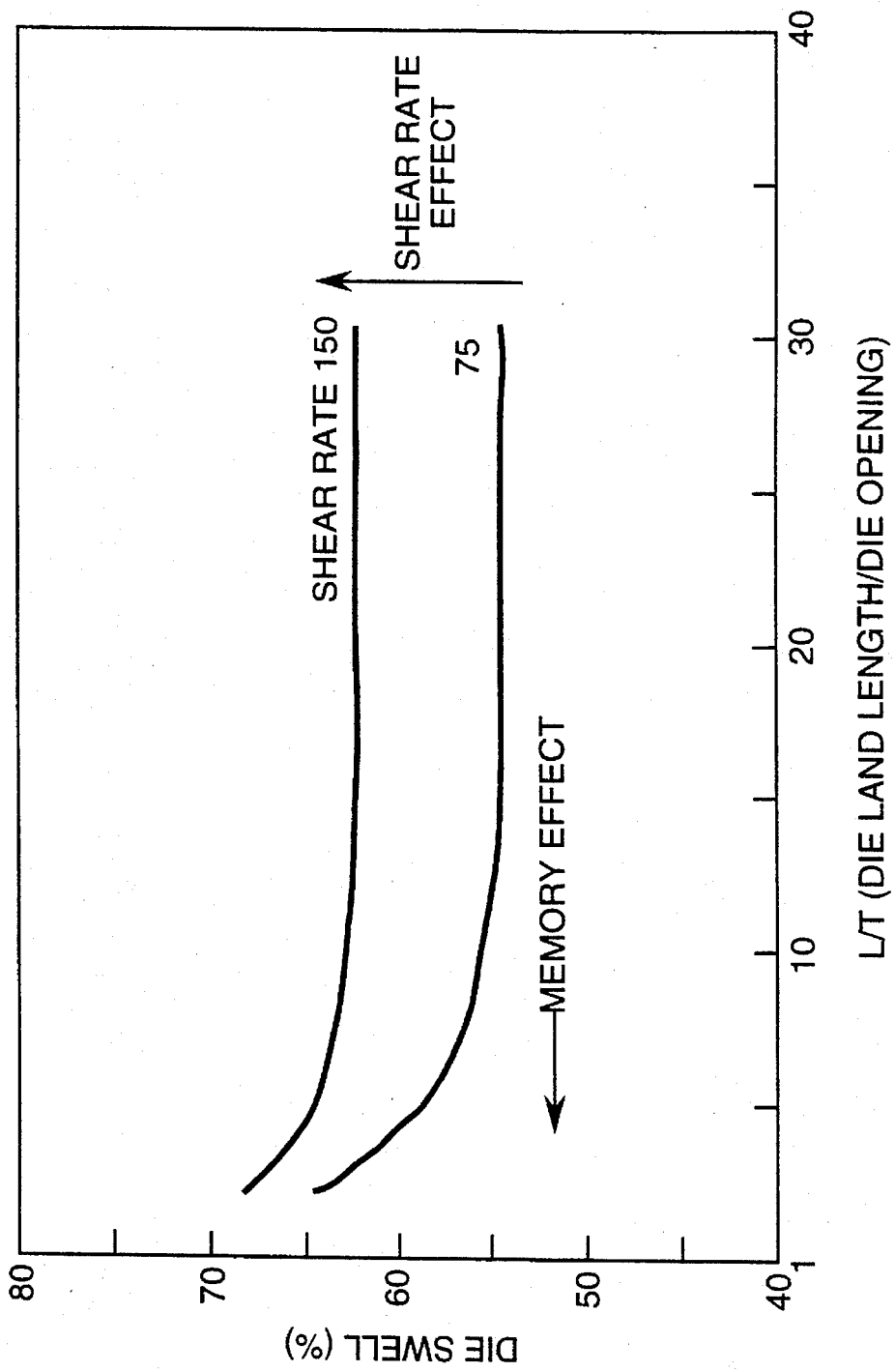
FIG. 4 shows the relationship between the die swell and the ratio of the die land length to die opening for the polymer.

FIG. 2 is a computer generated two-dimensional output showing die swell with and without draw down. During draw down the flow rate of the resin through the die is unbalanced (i.e., the resin is pulled out of the die), while zero draw down means that the flow rate is balanced (i.e., the resin is not being pulled out of the die). As shown in FIG. 2, the die swell effects for draw down are more noticeable than with zero draw down. Die swell is less for draw down because the resin is being pulled through the length of the die land preventing the resin from returning to its normal state, while zero draw down has no pull so that the resin can return to its natural effect. Both the measured and the calculated die swells for the polymer under zero draw down conditions are shown in FIG. 3. From the parametric relationships provided in FIGS. 2 and 3, the relationship between the die swell and the ratio of the die land length to die opening thickness is modeled. FIG. 4 shows the relationship between the die swell and the ratio of the die land length to die opening for the polymer. As shown in FIG. 4 the die swell diminishes as the ratio of the die land length to die opening thickness increases. For the polymer resin, the die swell begins to remain constant for a die land length to die opening thickness ratio of about 20. For a profile with sections of different thickness, the maximum thickness should be used for calculating the land length. As the die swell levels off so does the shear effects. The die land length to die opening thickness ratios that correspond to the reduced die swells and shear effects can then be used as values for the design of the die plate.

Figure 5:
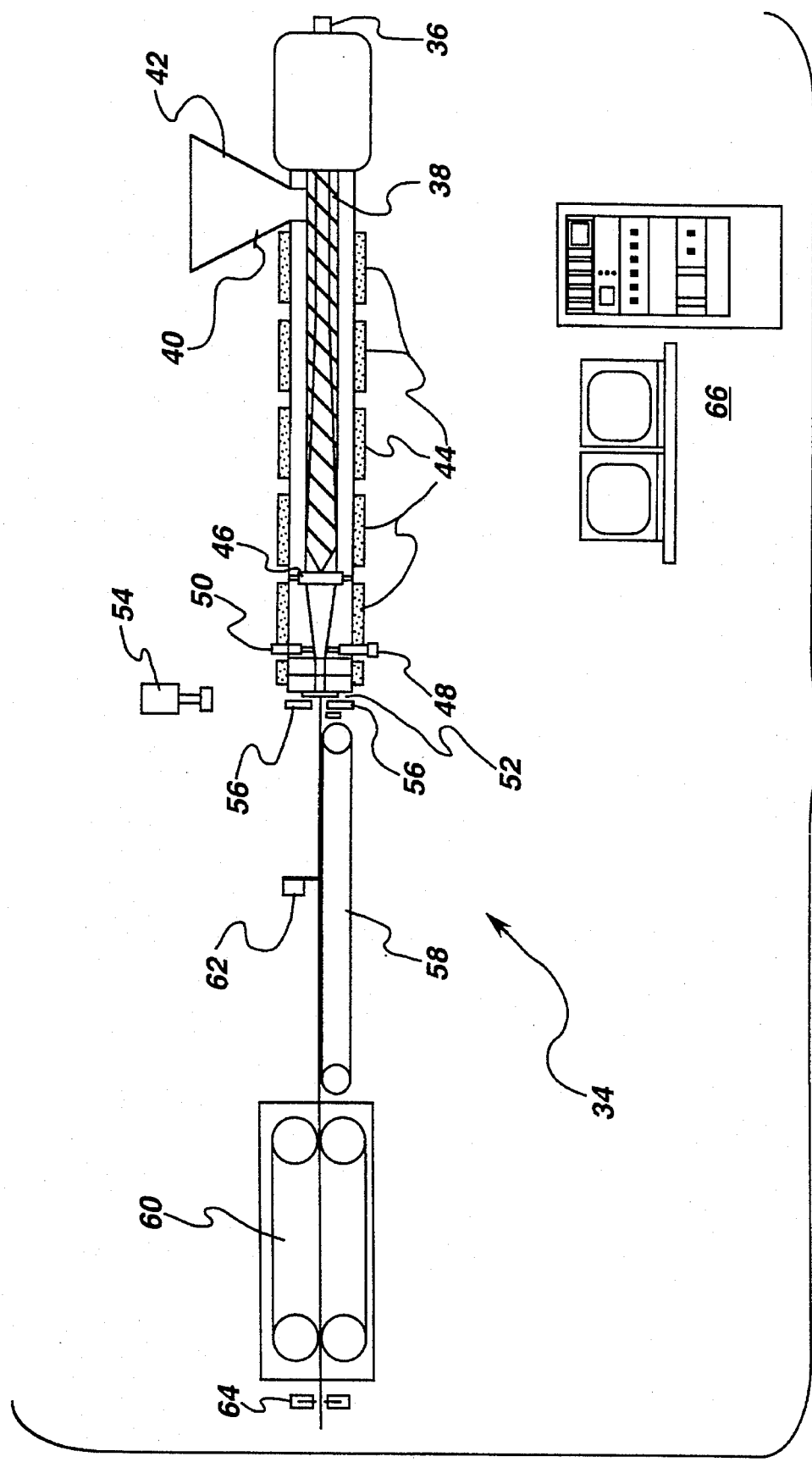
FIG. 5 is an instrumentation and data acquisition system used in the present invention to study the flow rate effect on die swell.

After a representation of die swell and the ratio of the die land length to die opening thickness and the corresponding shear rates have been modeled, the flow rate effect on die swell for experimental dies in an extrusion process are studied on-line using an instrumentation and data acquisition system 34 as shown in FIG. 5. In the instrumentation and data acquisition system, a sensor 36 measures the screw speed of a screw 38 that is used by the extruder to mix and blend the resin material. The screw speed measurement is then used to determine the volumetric flow rate and shear rate of the resin in the extruder. A resin thermocouple 40 measures the temperature of the resin going into the extruder through a hopper 42. A thermocouple 44 measures the temperature at each section of the screw 38 within the extruder. A breaker plate thermocouple 46 measures the temperature of the die body and a pressure transducer 48 and thermocouple 50 measure the pressure and the temperature of the resin at the pre-land. The temperature of the melted resin surface after it has left the land or die plate is measured by a thermocouple 52. The die swell of the hot resin in the width direction is measured by video cameras 54, while die swell in the thickness direction at the die end is measured by laser gauges 56. The speed of the resin (i.e., pull speed) as it is being pulled out of the die by a conveyor 58 and a puller 60 is measured by a reference marker 62. Before the resin is cut, the swell of the resin after it has cooled is measured again by LVDTs 64 in both the thickness and width direction. Usually there is a slight dimensional change between the hot and cold sections of the resin due to thermal expansion. The above-measured parameters are then sent to a computer terminal 66 where the data is recorded and used later.

Figure 6:
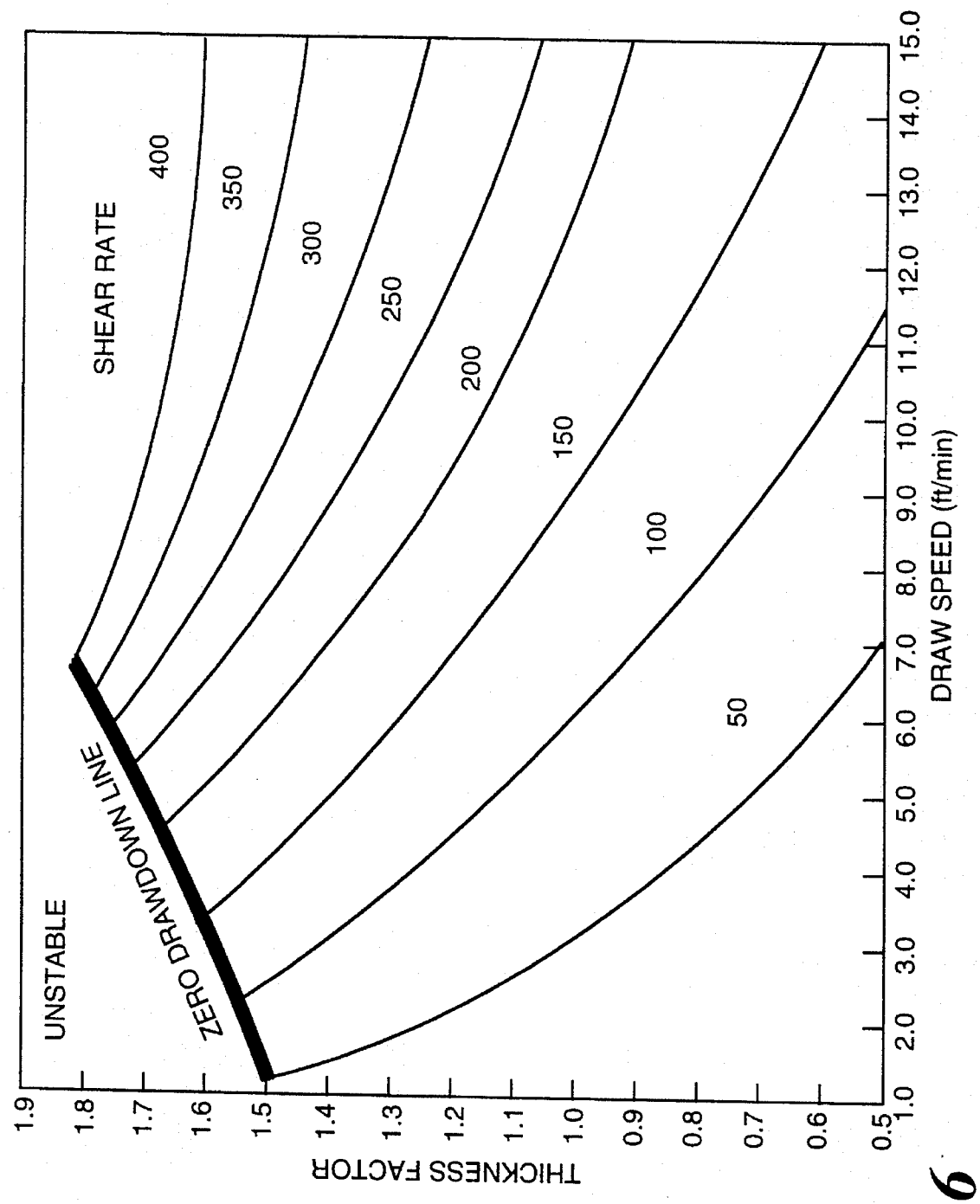
FIG. 6 shows a design chart used for designing die opening thickness.
Figure 7:
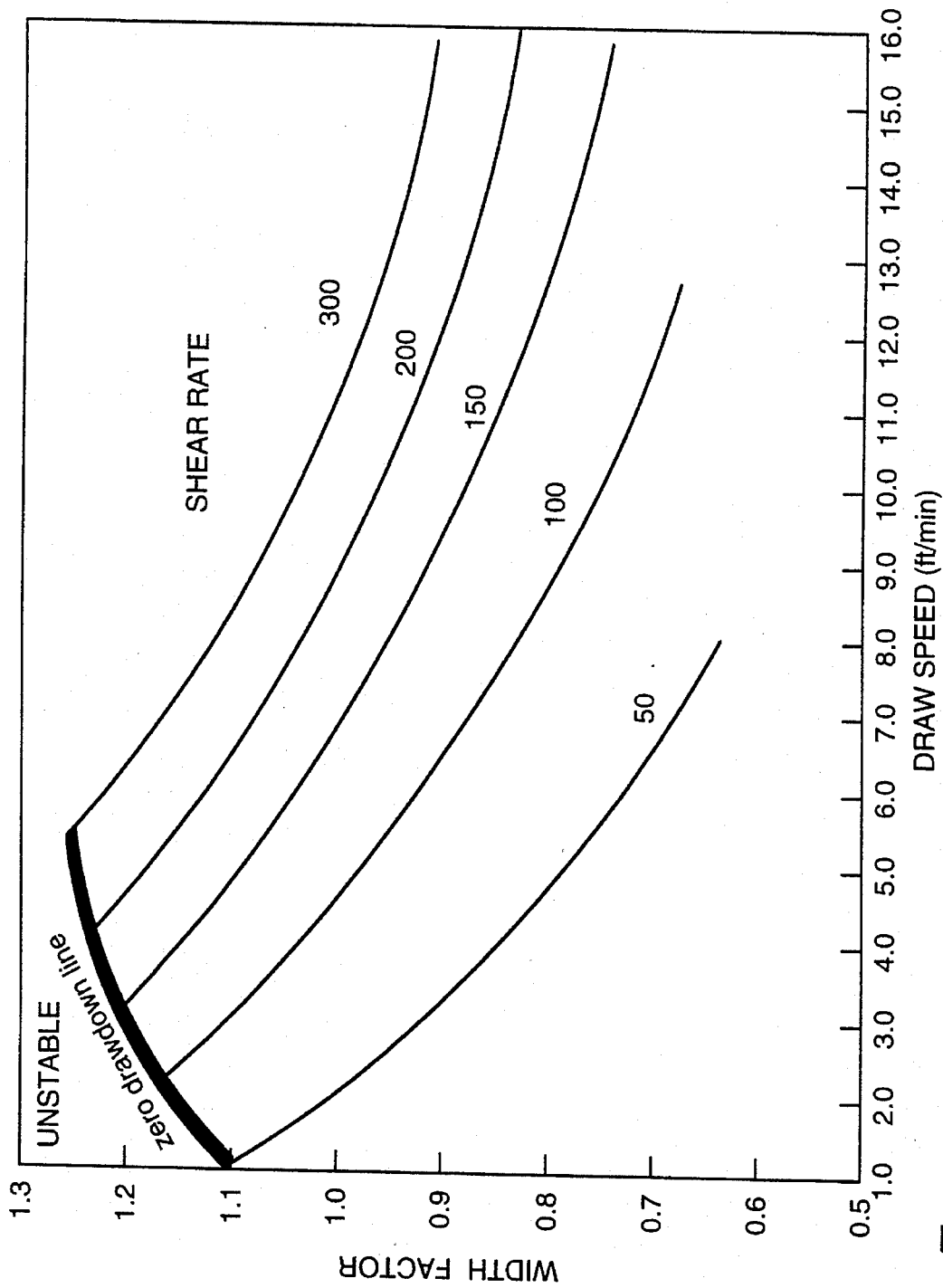
FIG. 7 shows a design chart used for designing die opening width.

The experimental data and the modeled representation are then arranged into die design charts. FIG. 6 shows a design chart used for designing the die opening thickness and FIG. 7 shows a design chart used for designing the die opening width. The design charts in FIGS. 6 and 7 contain a plurality of curves showing the shear rate at different draw speeds with a corresponding thickness and width factors, respectively. As shown in FIG. 6, the constant shear rate lines are not uniformly distributed because of the non-linear relationship between the die swell and the shear rate. When the draw speed is beyond the concave downward line, then the resin flow becomes very unstable due to the unbalanced mass flow (i.e., the negative draw down). After the design charts have been obtained, the charts can then be placed in a memory such as a ROM or a diskette and used with a computer.

Usually in a profile die there are many sections having different thicknesses. FIGS. 6 and 7 indicate that different wall thicknesses will give different shear rates and subsequently different die swells under one draw speed. The design charts can then be used by a designer to determine profile dimensions of a desired product once the shear rate and draw speed are known. For example, if the shear rate is 150 and the draw speed is 9.0 ft/min then the design charts will generate a thickness factor of about 1.0 and a width factor of about 0.92 if a calibrator is used. Both the thickness and width factors are then used to determine profile dimensions for a desired profile extrusion die plate in a manner which is explained below in further detail.

Figure 8:
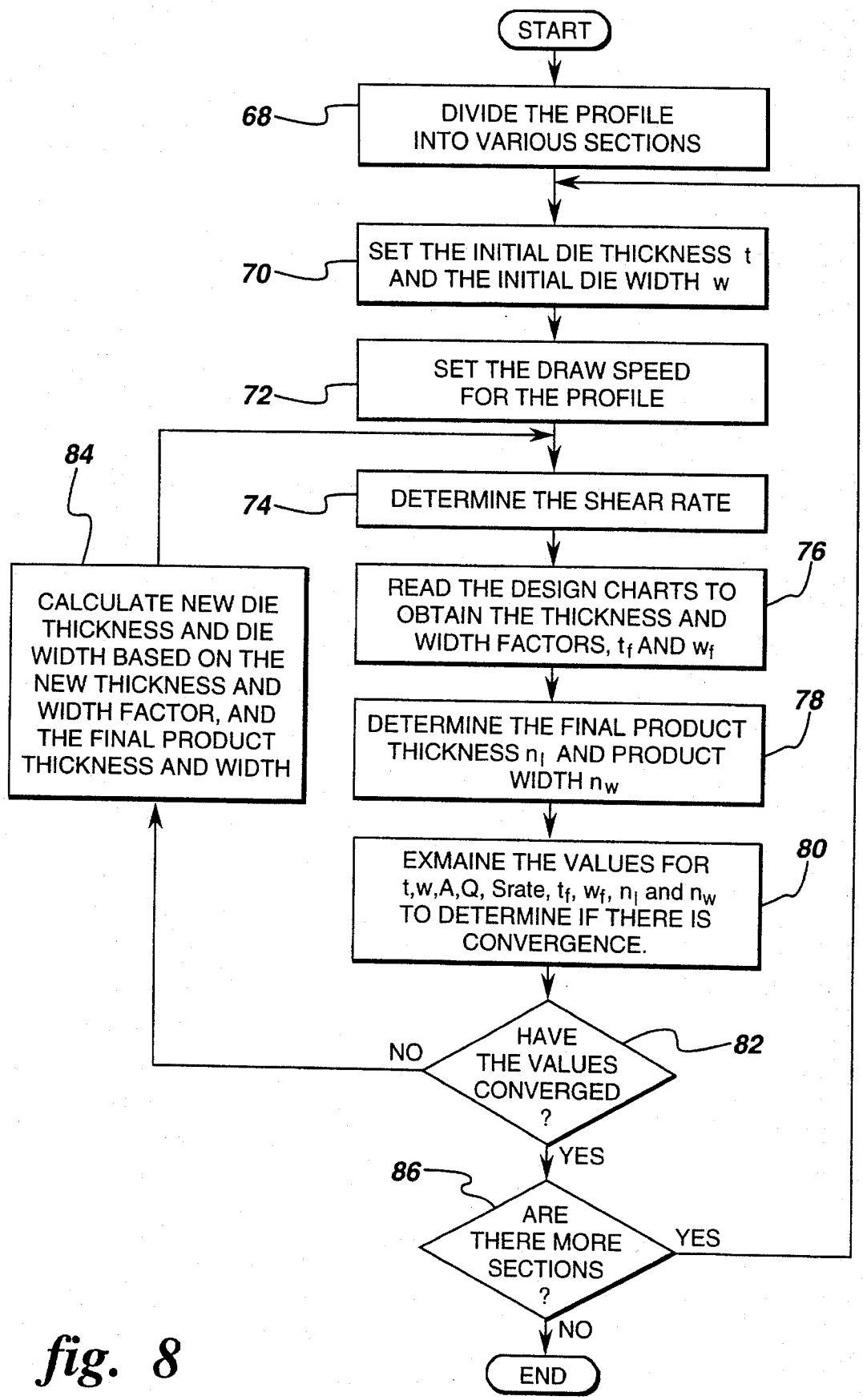
FIG. 8 is a flow chart illustrating the procedures for using the design charts to design a profile die.

After the die design charts have been obtained, the charts are then used to determine the profile dimensions for a desired profile extrusion die. FIG. 8 sets forth a flow chart illustrating the procedures for applying the design charts of FIGS. 6 and 7. At 68, the operation begins by dividing the desired profile into various sections where each section is a rectangle. Then the smallest dimension of the profile is designated the die thickness, t (inches), and the largest dimension is designated die width, w (inches). The initial thickness and width values are then set at 70. Usually the values are set equal to the final product dimensions. Next, the throughput rate, E (ft/min), known as the puller or draw speed, for the profile is set at 72. Typically, the magnitude of the draw speed is based on experience and usually the draw speed is limited by the calibrator cooling capacity. After the draw speed has been set, the shear rate $S_{rate}$ ($s^{-1}$) is determined at 74, assuming that the die dimensions are the same as the profile dimensions. The shear rate $S_{rate}$, is equal to:

$$S_{rate} = \frac{6 \cdot Q}{w \cdot t^2}, \text{ wherein} \tag{1}$$

Q is the associated volumetric flow rate of the resin. The volumetric flow rate Q, is equal to:

$$Q = E \cdot A, \tag{2}$$

wherein
A (in$^2$) is the cross-sectional area of each section of the profile. The cross-sectional area A is equal to:

$$A = n_t \cdot n_w, \tag{3}$$

wherein $n_t$ and $n_w$ are the product thickness and width.

Since the material flowing through each section experiences die swell that is proportional to the shear rate, the magnitude of the die swell is different in the thickness and the width directions. Thus, after the shear rate has been determined, the design charts of FIGS. 6 and 7 are used at 76 to determine the die dimensions needed to produce a product of specified dimensions. In particular, the thickness factor $t_f$ from FIG. 6 and the width factor $w_f$ from FIG. 7 are used to the die dimensions. The thickness factor $t_f$ and the width factor $w_f$ are defined as:

$$t_f = \frac{n_t}{t} \tag{4}$$

$$w_f = \frac{n_w}{w} \tag{5}$$

Since the draw speed E and the shear rate for each section are known, all that a designer has to do is find the draw speed on the x-axis of either FIGS. 6 and 7 and traverse along that speed until the line intersects the curve for the shear rate. Then the corresponding thickness factor and width factor are read. After the thickness factor $t_f$ and the width factor $w_f$ have been read, these values along with the die thickness t and the die width w are used at 78 to determine the final product thickness $n_t$ and the product width $n_w$. The final product thickness $n_t$ and the product width $n_w$ are determined as follows:

$$n_t = t \cdot t_f \tag{6}$$

$$n_w = w \cdot w_f \tag{7}$$

Next, the values for t, w, A, Q, $S_{rate}$, $t_f$, $w_f$, $n_t$, and $n_w$ are examined at 80 and 82 to determine if the values have converged. If the values have not converged, then a new die thickness and die width are calculated at 84 based on the new thickness and width factors and the final product thickness and width. Afterwards, steps 74–82 are repeated until the values have converged. Once the values have converged, the determinations in steps 70–84 are repeated for the next section of the profile if there are more sections at 86. Otherwise, the operation is over if there are no more sections.

Figure 9:
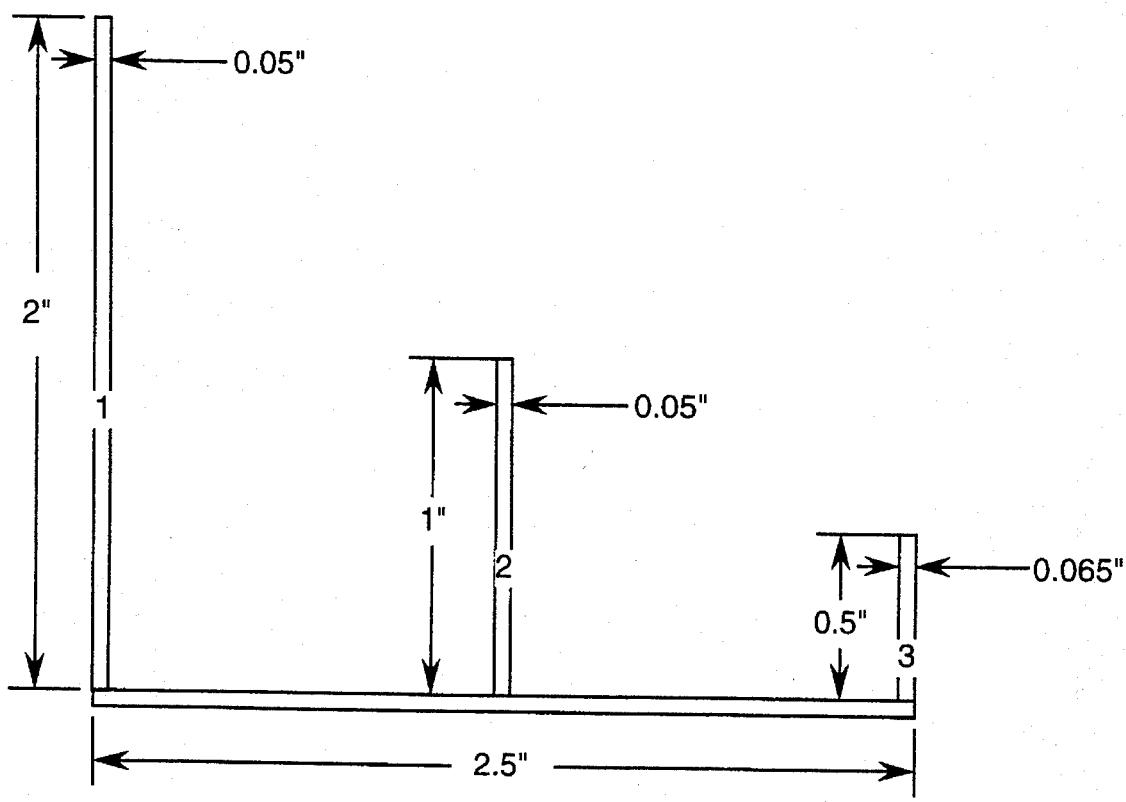
FIG. 9 is an example of a product that can be formed from a profile die made in accordance with the present invention.

An example of how the flow chart of FIG. 8 is used to determine the dimensions of profile for a particular product is described with reference to a profile 88 shown in FIG. 9. In accordance with the flow chart of FIG. 8, the first step is to divide the profile of FIG. 9 into various sections. In this example there are four sections, 1, 2, 3 and 4. Next, for each section, the initial die thickness, t, and the initial die width, w, are set in accordance with the final product dimensions as shown in FIG. 9. After setting the initial thickness and width, the draw speed, E, is set, equal to 12 ft/min. Then the cross-sectional areas, volumetric flow rates, and the shear rates are calculated using equations 1, 2, and 3. For section 1, the shear rate is 213.0 $s^{-1}$. Since the draw speed is 12 ft/min and the shear rate is 213.0 $s^{-1}$, the design chart of FIG. 6 gives a thickness factor $t_f$ of 1.367 and the design chart of FIG. 7 gives a width factor $w_f$ of 0.876. Similarly, the thickness factor $t_f$ and the width factor $w_f$ can be determined for sections 2, 3 and 4. The product thickness $n_t$ and the product width $n_w$ are then calculated using equations 4 and 5. For example, for section 1, a die thickness of 0.05 inches resulted in a product thickness of 0.062 inches. During the second iteration, the die thickness is proportionally decreased to 0.051 inches (i.e., $$\frac{design\ dimension}{factor}).$$

Also, for section 1, a die width of 2.0 inches resulted in a product width of 0.876 inches. During the second iteration, the die width is proportionally increased to 1.035 inches. These steps are repeated until the values for the product thickness $n_t$ and the product width $n_w$ for section 1 converge to the product design dimensions. Similarly, the same steps are repeated for sections 2, 3, and 4. After going through the design procedure set forth in FIG. 8 iteratively, the final dimensions of the die are set.

It is therefore apparent that there has been provided in accordance with the present invention, a method for designing a profile extrusion die plate that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A method for designing a profile extrusion die, the method comprising the steps of:

providing a representation of a product made from a polymer resin material and shaped by a die, the representation illustrating a relationship between die swell of the resin, shear rate of the resin through the die, and the ratio of die land length of the die to die opening thickness of the die;

determining from the representation instances where the ratio of die land length of the die to die opening thickness of the die minimizes die swell of the resin;

obtaining experimental data of the product and resin shaped by an experimental die, the experimental data including shear rate, draw speed, and die swell of the resin;

arranging the representation and the experimental data into a die design chart for die opening thickness and die opening width, the design chart for die opening thickness containing representations of shear rate, draw speed, and a thickness factor, the design chart for die opening width containing representations of shear rate, draw speed, and a width factor; and using the die design chart to determine dimensions for a desired profile extrusion die.

2. A method according to claim 1, wherein the die swell of the resin levels off as the ratio of die land length to die opening thickness of the die increases.

3. A method according to claim 2, wherein the ratio of die land length to die opening thickness is about 20.

4. A method according to claim 1, wherein the representation in the die design charts are a plurality of shear rate curves.

5. A method according to claim 4, wherein the plurality of shear rate curves for the die opening thickness chart converge at a point where the draw speed of the resin becomes unstable and the plurality of shear rate curves for the die opening width chart diverge at a point where the draw speed of the resin becomes unstable.

6. A method according to claim 1, wherein the step of using the die design chart to determine dimensions of an extrusion die plate to obtain a desired profile comprises:

dividing the desired profile into a plurality of sections;

setting initial die thickness and width to the final dimensions of the profile;

setting the draw speed for the profile; and determining the shear rate for the profile.

7. A method according to claim 6, further comprising:

reading the design charts to obtain a thickness and width factor for the corresponding draw speed and shear rate;

determining the final product thickness and width from the thickness and width factors; and repeating the steps of setting die thickness and width, setting draw speed, determining shear rate, reading the design charts, and determining final product thickness and width, until values converge.

8. A method according to claim 1, further comprising implementing the die design chart into a memory of a processor.

9. A method for designing a profile extrusion die for shaping a resin, the method comprising the steps of:

providing a representation of the resin shaped by a die, the representation illustrating a relationship between die swell of the resin, shear rate of the resin through the die, and the ratio of die land length of the die to die opening thickness of the die;

determining from the representation instances where the ratio of die land length to die opening thickness minimizes die swell of the resin, the die swell of the product leveling off as the ratio of die land length to die opening thickness increases;

obtaining experimental data of the resin shaped by an experimental die, the experimental data including draw speed, shear rate, and die swell;

arranging the representation and the experimental data into a die design chart for die opening thickness and die opening width, the design chart for die opening thickness containing representations of draw speed, a thickness factor, and shear rate, the design chart for die opening width containing representations of draw speed, a width factor, and shear rate; and using the die design charts to determine dimensions for a desired profile extrusion die.

10. A method according to claim 9, wherein the representation in the die design charts are a plurality of shear rate curves.

11. A method according to claim 10, wherein the plurality of shear rate curves for the die opening thickness chart converge at a point where the draw speed of the resin becomes unstable and the plurality of shear rate curves for the die opening width chart diverge at a point where the draw speed of the resin becomes unstable.

12. A method according to claim 9, wherein the step of using the die design chart to determine dimensions of an extrusion die to obtain a desired profile comprises:

dividing the desired profile into a plurality of sections;

setting initial die thickness and width to the final dimensions of the profile;

setting the draw speed for the profile; and determining the shear rate for the profile.

13. A method according to claim 12, further comprising:

reading the design charts to obtain a thickness and width factor for the corresponding draw speed and shear rate;

determining the final product thickness and width from the thickness and width factors; and repeating the steps of setting die thickness and width, setting draw speed, determining shear rate, reading the design charts, and determining final product thickness and width, until values converge.

14. A method for designing a profile extrusion die for shaping a resin product, the method comprising the steps of:

providing a representation of the resin shaped by a die, the representation illustrating a relationship between die swell of the resin, shear rate of the resin through the die, and the ratio of die land length of the die to die opening thickness of the die;

determining from the representation instances where the ratio of die land length to die opening thickness minimizes die swell of the resin, the die swell of the product leveling off as the ratio of die land length to die opening thickness increases;

obtaining experimental data of the resin shaped by an experimental die, the experimental data including draw speed, shear rate, and die swell;

arranging the representation and the experimental data into a die design chart for die opening thickness and die opening width, the design chart for die opening thickness containing representations of draw speed, a thickness factor, and shear rate, the design chart for die opening width containing representations of draw speed, a width factor, and shear rate, wherein the representation in the die design charts are a plurality of shear rate curves;

implementing the die design charts into a memory of a processor; and using the die design chart in the processor memory to determine profile dimensions of a desired profile extrusion die.

15. A method according to claim 14, wherein the step of using the die design charts to determine dimensions of an extrusion die to obtain a desired profile comprises:

dividing the desired profile into a plurality of sections;

setting initial die thickness and width to the final dimensions of the profile;

setting the draw speed for the profile; and determining the shear rate for the profile.

16. A method according to claim 15, further comprising:

reading the design charts to obtain a thickness and width factor for the corresponding draw speed and shear rate;

determining the final product thickness and width from the thickness and width factors; and repeating the steps of setting die thickness and width, setting draw speed, determining shear rate, reading the design charts, and determining final product thickness and width, until values converge.

17. An article of manufacture, comprising:

a computer usable medium containing computer readable program code means embodied therein for designing a profile extrusion die for a profile, the computer readable program code means in said article of manufacture comprising:

first computer readable program code means for dividing the profile into a plurality of sections;

second computer readable program code means for setting initial die thickness and width to the final dimensions of the profile;

third computer readable program code means for setting the draw speed for the profile;

fourth computer readable program code means for determining the shear rate for the profile;

fifth computer readable program code means for reading design charts stored in a memory to obtain a thickness and width factor for the corresponding draw speed and shear rate;

sixth computer readable program code means for determining the final product thickness and width from the thickness and width factors; and seventh computer readable program code means for repeating the steps of setting die thickness and width, setting draw speed, determining shear rate, reading the design charts, and determining final product thickness and width, until values converge.

* * * * *